(12) United States Patent
Vromans

(10) Patent No.: US 8,416,880 B2
(45) Date of Patent: Apr. 9, 2013

(54) DIGITAL MODULATOR

(75) Inventor: Jan S Vromans, Maastricht (NL)

(73) Assignee: NXP B.V. (NL)

( * ) Notice: Subject to any disclaimer, the term of this patent is extended or adjusted under 35 U.S.C. 154(b) by 0 days.

(21) Appl. No.: 12/934,346

(22) PCT Filed: Mar. 27, 2009

(86) PCT No.: PCT/IB2009/051288
§ 371 (c)(1),
(2), (4) Date: Sep. 24, 2010

(87) PCT Pub. No.: WO2009/122333
PCT Pub. Date: Oct. 8, 2009

(65) Prior Publication Data
US 2011/0044404 A1    Feb. 24, 2011

(30) Foreign Application Priority Data
Mar. 31, 2008 (EP) .................................. 08103182

(51) Int. Cl.
*H04L 27/00* (2006.01)
(52) U.S. Cl.
USPC ........................................................ 375/295
(58) Field of Classification Search .............. None
See application file for complete search history.

(56) References Cited

U.S. PATENT DOCUMENTS

| | | | | | |
|---|---|---|---|---|---|
| 3,896,399 | A | * | 7/1975 | McDonald | 341/143 |
| 3,921,103 | A | * | 11/1975 | Burger | 332/104 |
| 4,155,260 | A | * | 5/1979 | Engeler et al. | 73/626 |
| 4,961,204 | A | * | 10/1990 | Tanaka et al. | 375/242 |
| 5,463,661 | A | * | 10/1995 | Moran et al. | 375/222 |
| 5,589,805 | A | * | 12/1996 | Zuraski et al. | 332/109 |
| 5,731,728 | A | * | 3/1998 | Greiss | 327/299 |
| 5,745,063 | A | * | 4/1998 | Gruber et al. | 341/143 |
| 5,886,513 | A | * | 3/1999 | Appeltans et al. | 323/283 |

(Continued)

FOREIGN PATENT DOCUMENTS

| | | |
|---|---|---|
| EP | 1 178 605 A1 | 2/2002 |
| GB | 2 400 996 A | 10/2004 |
| JP | 2004-345280 A | 12/2004 |
| WO | 2007/031840 A1 | 3/2007 |

OTHER PUBLICATIONS

International Search Report and Written Opinion for international patent appln. No. PCT/IB2009/051288 (Dec. 22, 2009).

*Primary Examiner* — David C. Payne
*Assistant Examiner* — Bahman Badipour

(57) ABSTRACT

The application relates to a digital modulator comprising at least one input terminal configured to receive at least one signal, at least one symbol generating unit comprising a first output terminal and at least a second output terminal, wherein the symbol generating unit is configured to generate a first symbol waveform for the first output terminal depending on the received signal, and wherein the symbol generating unit is configured to generate at least a second symbol waveform for the second output terminal depending on the received signal, wherein the first symbol waveform comprises at least one different parameter value compared to the second symbol waveform, at least one third output terminal connectable to at least the first output terminal and/or second output terminal via a switching unit, a controlling unit configured to control the switching unit depending on the received signal such that a modulated output signal is generated.

22 Claims, 9 Drawing Sheets

U.S. PATENT DOCUMENTS

| | | | | |
|---|---|---|---|---|
| 5,896,101 | A * | 4/1999 | Melanson | 341/143 |
| 5,926,065 | A * | 7/1999 | Wakai et al. | 329/304 |
| 6,421,396 | B1 * | 7/2002 | Hawley et al. | 375/308 |
| 6,538,484 | B1 * | 3/2003 | Rappaport et al. | 327/172 |
| 6,903,619 | B2 * | 6/2005 | Dennis et al. | 332/112 |
| 6,985,538 | B2 * | 1/2006 | Murakami et al. | 375/280 |
| 7,199,744 | B1 * | 4/2007 | Melanson | 341/152 |
| 7,236,543 | B2 * | 6/2007 | Wang et al. | 375/308 |
| 7,248,193 | B2 * | 7/2007 | Fujimoto | 341/143 |
| 7,405,686 | B2 * | 7/2008 | Laroia et al. | 341/143 |
| 7,515,652 | B2 * | 4/2009 | Jensen | 375/308 |
| 7,538,703 | B2 * | 5/2009 | Yu | 341/143 |
| 7,633,833 | B2 * | 12/2009 | Takemura et al. | 365/233.11 |
| 7,706,456 | B2 * | 4/2010 | Laroia et al. | 375/260 |
| 7,778,293 | B2 * | 8/2010 | Vanier | 372/28 |
| 7,804,763 | B2 * | 9/2010 | Berkman et al. | 370/208 |
| 7,817,725 | B2 * | 10/2010 | Matsuura et al. | 375/245 |
| 7,928,876 | B2 * | 4/2011 | Thomsen et al. | 341/143 |
| 7,979,036 | B2 * | 7/2011 | Zheng | 455/102 |
| 2002/0005861 | A1 * | 1/2002 | Lewis | 345/691 |
| 2002/0180547 | A1 * | 12/2002 | Staszewski et al. | 332/115 |
| 2004/0120393 | A1 * | 6/2004 | Lin | 375/232 |
| 2004/0152427 | A1 * | 8/2004 | Chiu et al. | 455/85 |
| 2004/0222846 | A1 * | 11/2004 | Melanson et al. | 330/10 |
| 2005/0063474 | A1 * | 3/2005 | Choi et al. | 375/240.28 |
| 2005/0141636 | A1 * | 6/2005 | Minami et al. | 375/295 |
| 2005/0146366 | A1 * | 7/2005 | Steinschaden | 327/175 |
| 2006/0088081 | A1 * | 4/2006 | Withington et al. | 375/130 |
| 2006/0203713 | A1 * | 9/2006 | Laroia et al. | 370/209 |
| 2006/0223461 | A1 * | 10/2006 | Laroia et al. | 455/103 |
| 2006/0262841 | A1 * | 11/2006 | Vaisanen et al. | 375/227 |
| 2007/0040618 | A1 * | 2/2007 | Ahmed et al. | 331/16 |
| 2007/0126504 | A1 * | 6/2007 | Macphail | 330/251 |
| 2007/0165740 | A1 * | 7/2007 | Koslar et al. | 375/271 |
| 2008/0074154 | A1 * | 3/2008 | Shin | 327/105 |
| 2008/0303565 | A1 * | 12/2008 | Hsu | 327/157 |
| 2008/0316950 | A1 * | 12/2008 | Damnjanovic | 370/311 |
| 2009/0052568 | A1 * | 2/2009 | Uchida et al. | 375/261 |
| 2010/0098177 | A1 * | 4/2010 | Hamaguchi et al. | 375/260 |
| 2010/0135426 | A1 * | 6/2010 | Maltsev et al. | 375/260 |
| 2010/0284355 | A1 * | 11/2010 | Jung et al. | 370/329 |
| 2010/0316149 | A1 * | 12/2010 | Matsushita et al. | 375/260 |
| 2011/0051763 | A1 * | 3/2011 | Vanier | 372/38.02 |
| 2011/0141780 | A1 * | 6/2011 | O'Malley et al. | 363/123 |
| 2011/0269396 | A1 * | 11/2011 | Beeler et al. | 455/9 |

* cited by examiner

| | $\hat{d}_l$ | MSB | | | LSB | | SWITCH PATTERN SWP | | COARSE SYMBOL SELECTION BY MSB BITS |
|---|---|---|---|---|---|---|---|---|---|
| | | | | | | | A | B | |
| | $\hat{d}_0$ | 0 | 0 | 0 | 0 | 0 | 0000 | 1111 | |
| | | 0 | 0 | 0 | 0 | 1 | 1000 | 0111 | |
| | | 0 | 0 | 0 | 1 | 0 | 1100 | 0011 | |
| | | 0 | 0 | 0 | 1 | 1 | 1110 | 0001 | |
| | $\hat{d}_1$ | 0 | 0 | 1 | 0 | 0 | 0000 | 1111 | |
| | | 0 | 0 | 1 | 0 | 1 | 1000 | 0111 | |
| | | 0 | 0 | 1 | 1 | 0 | 1100 | 0011 | |
| | | 0 | 0 | 1 | 1 | 1 | 1110 | 0001 | |
| | $\hat{d}_2$ | 0 | 1 | 0 | 0 | 0 | 0000 | 1111 | |
| | | 0 | 1 | 0 | 0 | 1 | 1000 | 0111 | |
| $d_n$ | | 0 | 1 | 0 | 1 | 0 | 1100 | 0011 | $symb_1 = \hat{d}_2$   $symb_1 = \hat{d}_3$ |
| | | 0 | 1 | 0 | 1 | 1 | 1110 | 0001 | |
| | $\hat{d}_3$ | 0 | 1 | 1 | 0 | 0 | 0000 | 1111 | |
| | | 0 | 1 | 1 | 0 | 1 | 1000 | 0111 | |
| | | 0 | 1 | 1 | 1 | 0 | 1100 | 0011 | |
| | | 0 | 1 | 1 | 1 | 1 | 1110 | 0001 | |
| | $\hat{d}_4$ | 1 | 0 | 0 | 0 | 0 | 0000 | 1111 | |
| | | 1 | 0 | 0 | 0 | 1 | 1000 | 0111 | |
| | | 1 | 0 | 0 | 1 | 0 | 1100 | 0011 | |
| $d_{n+1}$ | | 1 | 0 | 0 | 1 | 1 | 1110 | 0001 | $symb_1 = \hat{d}_4$   $symb_2 = \hat{d}_5$ |
| | $\hat{d}_5$ | 1 | 0 | 1 | 0 | 0 | 0000 | 1111 | |
| | | 1 | 0 | 1 | 0 | 1 | 1000 | 0111 | |
| | | 1 | 0 | 1 | 1 | 0 | 1100 | 0011 | |
| | | 1 | 0 | 1 | 1 | 1 | 1110 | 0001 | |
| | $\hat{d}_6$ | 1 | 1 | 0 | 0 | 0 | 0000 | 1111 | |
| | | 1 | 1 | 0 | 0 | 1 | 1000 | 0111 | |
| | | 1 | 1 | 0 | 1 | 0 | 1100 | 0011 | |
| | | 1 | 1 | 0 | 1 | 1 | 1110 | 0001 | |
| | $\hat{d}_7$ | 1 | 1 | 1 | 0 | 0 | 0000 | 1111 | |
| | | 1 | 1 | 1 | 0 | 1 | 1000 | 0111 | |
| | | 1 | 1 | 1 | 1 | 0 | 1100 | 0011 | |
| | | 1 | 1 | 1 | 1 | 1 | 1110 | 0001 | |

DIGITAL MODULATOR

TECHNICAL FIELD

The application relates to a digital modulator comprising an input terminal and a symbol generating unit. Moreover, the application relates to a transmitter comprising the digital modulator, a method and a computer readable medium having a computer program stored thereon for generating a modulated output signal.

BACKGROUND

Transmitters are widely used in several application areas, like mobile radio or satellite technology. It is important for systems of such technology areas that energy consumption is small due to the limited power supply. Thus, it is an ongoing concern of the industry to reduce power consumption of transmitters.

One possible solution for reducing power consumption is to use power efficient amplifiers, like switching power amplifiers. Several ways are known in prior art for controlling a switching power amplifier. However, switching power amplifiers has to be driven by a signal comprising a good linearity. Due to this fact suitable modulation methods, like pulse width modulation (PWM), pulse position modulation (PPM) or pulse density modulation (PDM) are essential.

Moreover, it is an ongoing concern of the industry to increase the transfer rate. One possibility is to use the amplitude and the phase as information carriers to achieve a more efficient modulation scheme. However, this implicates linearity issues, in particular in connection with switching power amplifiers.

A switching power amplifier can be driven via its supply voltage, wherein the supply voltage may depend on the amplitude component. Another prior art solution for driving the switching power amplifier is to use a two-level PWM signal, which can be generated by comparing the amplitude modulated carrier signal and the phase modulated carrier signal with a saw tooth signal having a fundamental frequency of at least twice the carrier frequency. A further prior art modulation type may use a two-level PDM signal, which can be generated by a band-pass sigma-delta. All these solutions comprise an analogue circuitry. However, digital modulation may be desirable.

As already mentioned, a suitable solution may to convert a complex signal to a phase modulated signal comprising a constant envelope. Such signals can be produced by pre-distorting four base band signals. However, one issue is that an analogue circuitry is required and matching requirements may be high. Furthermore, a digital realization may comprise the drawback of extremely high sampling frequencies for achieving a desired resolution.

It is one object of the present application to provide a digital modulator to avoid analogue circuitry. It is a further object to provide a digital modulator with reduced required sampling frequencies. A further object is to avoid a significant loss in the resolution of the digital modulator. It is another object of the present application to provide reduced power consumption of the digital modulator.

SUMMARY

These and other objects are solved by a digital modulator, comprising at least one input terminal configured to receive at least one signal. The invention is defined by the independent claims. Dependent claims describe advantageous embodiments. The digital modulator comprises at least one symbol generating unit comprising a first output terminal and at least a second output terminal, wherein the symbol generating unit is configured to generate a first symbol waveform for the first output terminal depending on the received signal, and wherein the symbol generating unit is configured to generate at least a second symbol waveform for the second output terminal depending on the received signal. The first symbol waveform comprises at least one different parameter value compared to the second symbol waveform. The digital modulator comprises at least one third output terminal connectable to at least the first output terminal and/or second output terminal via a switching unit. The digital modulator comprises a controlling unit configured to control the switching unit depending on the received signal such that a modulated output signal is generated.

The digital modulator according to the present application can be employed within several transmitting devices for transmitting any kind of information, like data, speech or the like, to a suitable counterpart station. Thereby, the transmitting devices can be preferably used in wireless communication systems.

The digital modulator may comprise at least one input terminal for receiving at least a first signal. It is also possible that the digital modulator comprises more than one input terminal for receiving more than one input signal. The received signal may be a base band signal comprising at least parts of the information being transmitted. This signal may be generated by any kind of a signal generator.

Furthermore, the digital modulator comprises at least one symbol generating unit. The symbol generating unit may be connectable to the input terminal of the digital modulator. In other words, the received signal can be fed to the symbol generating unit at least in parts. Moreover, the generating unit comprises at least two output terminals.

In addition, the digital modulator comprises a controlling unit. Also the controlling unit can be connected to the input terminal of the digital modulator providing for feeding at least parts of the received signal to the controlling unit.

Contrary to expectations, it is found according to the present application that the needed sample frequency required for performing digital modulation to meet a desired resolution can be significantly reduced in case two symbol waveforms are generated and adaptive switching between these two symbol waveforms is performed.

The symbol generating unit may be configured to generate two symbol waveforms depending on the received signal. The symbol waveforms can be generated at the same time. However, these symbol waveforms do not comprise the desired accuracy, which may depend on a desired resolution or dynamic range of the digital modulator.

More particularly, two coarse symbol waveforms can be generated comprising a different parameter value. A particular symbol waveform is characterized by at least one particular parameter value. Each symbol being transmitted comprises a different symbol waveform, and thus, a different parameter value. Furthermore, the parameter value may be an indicator for the measure of the quality of the desired modulated signal.

It is found that for obtaining high accuracy of the modulated signal, both coarse symbol waveforms can be adaptively switched by the switching unit. Within one symbol period, the output terminal of the digital modulator may be connected to each output terminal of the generating unit for a particular time period to achieve the desired modulated signal with a high accuracy. By switching at least one time during a symbol period the sample frequency can be significantly reduced without a loss in the resolution.

According to another embodiment, the received signal may be a first quantized signal depending on an envelope component being transmitted and/or a phase component being transmitted. The information being transmitted can be represented by the envelope component as well as by the phase component of a signal. The present application provides for using both components resulting in a high flexibility and high data rate.

Furthermore, the digital modulator according to a further embodiment of the present application may comprise a converting unit configured to convert the received first quantized envelope component and/or phase component into a second quantized signal comprising the parameter value. In addition, the parameter value may be the duty cycle and/or phase and phase shift respectively. By way of example, a quantized amplitude can be converted into a quantized duty cycle in an easy manner. The quantized amplitude may be related to the quantized duty cycle via the arc tan-function. Similar, the phase component can be converted.

What is more, the symbol generating unit may be configured, according to another embodiment of the present application, to generate the first symbol waveform comprising a higher parameter value than the desired symbol waveform, and the second symbol waveform comprising a lower parameter value than the desired symbol waveform. It may be advantageous, in case both coarse symbol waveforms are adjacent to each other. In this case, the modulating signal can be determined by averaging the two symbol waveforms. For instance, the desired modulated signal may comprise a duty cycle, which is higher or lower compared to the first or second duty cycle, and thus, the average duty cycle may be the wanted duty cycle providing high accuracy of the signal.

For generating at least two possible waveforms, which are especially suitable for high efficient switching power amplifiers, the symbol generating unit may be configured to generate a pulse width modulated symbol waveform and/or a pulse position modulated symbol waveform. Both symbol waveforms are especially suitable due to their constant envelope. Thereby, the characterizing parameter value of the pulse width modulated symbol waveform may be the duty cycle, while the characterizing parameter value of the pulse position modulated symbol waveform may be the phase.

According to another embodiment, the digital modulator may comprise a clock generator configured to generate a first clock signal, wherein the first clock signal may depend at least on the dynamic range of the digital modulator. In other words, the clock generator may generate a clock signal comprising a sample frequency, which is high enough to meet the requirements for achieving a desired resolution of the present digital modulator. According to a further embodiment of the present, the first clock signal may be provided for driving the symbol generating unit. In particular, at least the symbol generating unit may be configured to be controllable depending on the first clock signal. However, this sample frequency may be not high enough for directly generating an modulated output signal comprising the desired high accuracy.

For avoiding the arrangement of a further clock generator, the digital modulator according to another embodiment may further comprise a first dividing unit configured to generate a second clock signal depending on the first clock signal and a first dividing factor. By dividing the first clock signal, the second clock signal may comprise a reduced frequency. The first dividing factor may depend on the maximum duty cycle and the maximum number of quantization levels. In other words, the dividing factor may represent the number of sample points within one symbol period.

Furthermore, at least the controlling unit may be configured to be controllable depending on the second clock signal according to a further embodiment. The required clock frequency for driving the controlling unit is significantly reduced due to the need of merely one sample point during one symbol period.

The digital modulator may comprise at least one second dividing unit configured to generate a third clock signal depending on the second clock signal and a second dividing factor. Moreover, according to a further embodiment, at least one delay unit may be configured to be controllable depending on the third clock signal. For suitable digital modulating, the incoming signal can be delayed by at least one symbol period resulting in that the instead of the actually symbol applied at the input terminal of the digital signal, the previous received symbol value can be processed. Further delay unit can be also employed. It may be possible that the delay units can be driven by an additional clock generator. However, the employment of a second divider instead of an additional clock generator may reduce the implementation effort.

A simple and fast determining and generating of the two coarse signal waveforms can be achieved using symbol tables. The symbol generating unit according to a further embodiment of the present application may comprise at least one symbol table provided for determining the first symbol waveform and/or the second symbol waveform depending on the received signal. For instance, the symbol generating unit may comprise a storage provided for recording the symbol table. Thereby, the possible values of the received signal may be associated with at least one symbol waveform. It may be possible to provide a symbol table for determining the first symbol waveform and a further symbol table for determining the second symbol waveform as well as merely one symbol table can be provided for determining both symbol waveforms. For instance, the first symbol waveform can be directly determined, while the second symbol waveform can be determined using predefined rules or the like.

For reducing the number of stored values and reducing the time being required for determining the respective symbol waveforms, the present application proposes to use merely parts of the received signal as address signal. According to an embodiment the at least one symbol table can be provided for determining the first symbol waveform and/or the second symbol waveform depending on at least the most significant bit (MSB) of the quantized signal. Preferably, for achieving a higher accuracy, more than one MSB bit can be used as address signal.

The performance of the digital modulator according to the present application can be improved, in case merely parts of the received signal are required for determining the switching ratio. In particular, the controlling unit may be configured to control the switching unit depending on at least the least significant bit (LSB) of the quantized signal. In other words, at least one LSB bit can be used as address signal. It shall be understood that more than one LSB bit can be used for improving the accuracy. As stated above, the received signal comprising a particular number of bits can be divided into MSB bits and LSB bits, wherein the actually division of the received signal may depend on the number of bits and/or further criteria, like the desired accuracy. By way of example, the switching periods can be determined by using respective stored tables, wherein the switching periods are stored associated to the LSB bits. Thereby, switching period means the time a particular output terminal of the generating unit is connected to the this output terminal of the digital modulator.

In another embodiment of the digital modulator according the present application, the controlling unit can be formed as a sigma delta modulator. A sigma delta modulator may comprise the advantage that the output signal pattern can be used in a simple manner for controlling the switching unit. More particularly, the ratio of the time period in which communication between a particular output terminal of the symbol generating unit and the output terminal of the digital modulator is established can be performed in a simple manner.

Furthermore, it is found according to the present application that besides the accuracy of the signal, the quality of the modulated output signal can be further improved by a smooth transition from one duty cycle or phase to the next duty cycle or phase. According to a further embodiment, the digital modulator may comprise a sequence controlling unit, wherein the sequence controlling unit may be configured to control the sequence of communication establishing of the switching unit depending on the current received signal and/or the next received signal. By way of example, if the next envelope sample may result in a larger duty cycle, it may be better to generate the average of the current duty cycle by first closing the switch with the small coarse duty cycle waveform and next the switch with the large coarse duty cycle. This may result in a smooth transition to the next duty cycle.

The power efficiency of the digital modulator can be improved by suitable power control. According to another embodiment, the digital modulator may comprise a power controlling unit, wherein the power controlling unit may be configured to control the selection of at least two symbol generating units. It is found that changing the duty cycle by changing the symbol generating units for phase signals, the power efficiency of the present digital modulator can be increased. For example, automatic gain control can be used for extra power control.

Another aspect of the present application is a transmitter comprising a digital modulator as stated above. Using digital modulator concepts, high matching requirements of analogue multipliers can be avoided as well as additional analogue circuitry. A transmitter may comprise, according to further variants of the application, more than one digital modulator. For example, the transmitter may comprise two phase modulator, two envelope modulators or a combination of them. The use of more than one digital modulator may increase the data rate of the transmitter.

Furthermore, the transmitter may comprise at least one amplifying unit according to another embodiment of the present application. It may be possible that for each implemented digital modulator at least one amplifying unit can be arranged. The amplifying unit can be implemented as a switching power amplifying unit within the transmitter for reducing power consumption. A switching amplifying unit may encompass at least one input for the signal being amplified and at least one input for voltage supply. Such a switching unit can be employed in combination with suitable modulation methods, like pulse width modulation (PWM). The switching power amplifier may be a class D or class E amplifier. These types of power amplifiers are especially suitable due to their small power consumption. However, similar amplifying devices can also be implemented into the transmitter according to the application. The present transmitter according to embodiments may provide for a significant power consumption reduction.

According to another embodiment of the present application, the transmitter may be formed as a switched linear amplification with non-linear components (LINC) transmitter. LINC transmitting concepts may comprise at least two digital modulators according to the present application. LINC transmitter provides for reduced power consumption and increased data rates.

Another aspect of the present application is a method for generating a modulated output signal, comprising receiving at least one signal, generating a first symbol waveform depending on the received signal, generating at least a second symbol waveform depending on the received signal, wherein the first symbol waveform comprises at least one different parameter value compared to the second symbol waveform, and generating the modulated output signal by switching a third output terminal to at least the first symbol waveform and/or the symbol second waveform, wherein switching is controlled depending on the received signal.

A further aspect of the present application is a computer readable medium having a computer program stored thereon. The computer program comprises instructions operable to cause a processor to perform at least the above stated method.

The present application can be deployed in several application areas which include efficient modulated transmitters. The transmitters can be used for WLAN, WPAN, Bluetooth, OFDM, GSM, UMTS, CDMA, low power mobile communication devices and the like.

These and other aspects of the present patent application become apparent from and will be elucidated with reference to the following Figures. The features of the present application and of its example embodiments as presented above are understood to be disclosed also in all possible combinations with each other.

BRIEF DESCRIPTION OF THE DRAWINGS

FIG. 9 depicts an exemplified table of a 5 bit quantized input signal.

Like reference numerals in different Figures indicate like elements.

DETAILED DESCRIPTION OF THE DRAWINGS

In the following detailed description of the present application, example embodiments of the present application will describe and point out a digital modulator or transmitter having a digital modulator comprising a reduced sample rate and high dynamic range.

Figure 1:
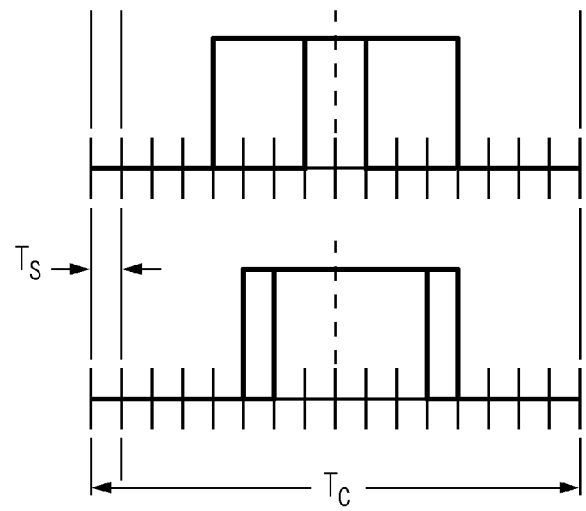
FIG. 1 depicts a diagram comprising an exemplified pulse width modulated waveform and pulse position modulated waveform.

FIG. 1 shows a diagram comprising an exemplified symbol pulse width modulated waveform and symbol pulse position modulated waveform. More particularly, the upper symbol waveforms depicted in FIG. 1 represent two possible PWM symbol waveforms and the lower symbol waveforms represent two possible PPM symbol waveforms. The depicted symbol waveforms are formed as ideal rectangular waveforms. The x-axis represents a symbol period $T_C$, wherein the symbol period or carrier period $T_C$ can be quantized by the sample period $T_S$. Thereby, the symbol period $T_C$ is given by following equation $$T_C = N_E * T_S, \quad (1.1)$$

wherein $N_E$ represents the number of minimal step size $T_S$. As can be seen from FIG. 1, the PWM waveform differs from the PPM waveform in that the centre may not change as a function of the duty cycle d variation. The PWM waveform is symmetrically while the PPM waveform may be unsymmetrically. Furthermore, the minimum resolution for a PWM waveform can be obtained by $$\Delta d = \frac{2T_S}{T_C} = \frac{2}{N_e} \quad (1.2)$$

and the minimum resolution for a PPM waveform can be determined by the minimal step size which the pulse or waveform respectively can be shifted with, resulting in the following equation $$\Delta d = \frac{2T_S}{T_C} = \frac{1}{N_e}. \quad (1.3)$$

In general, it can be seen that the minimal resolution $\Delta d$ can be determined by the ratio of $T_S$ and $T_C$. Since the resolution is limited, the resolution of the amplitude component or phase component is also limited. For simplicity reasons, the following derivations depend on the amplitude component and PWM symbols. It shall be understood that the derivations may be similar with respect to the phase component and PPM symbols.

The maximum usable duty cycle $d_{max}$ is given by $$d_{max} = 0.5. \quad (1.4)$$

From equation 1.4, the maximum number of quantization levels $L_{max}$ can be derived using equation 1.2 resulting in $$L_{max} = \frac{d_{max}}{\Delta d} = \frac{N_e}{4}. \quad (1.5)$$

From this equation 1.5, the index l of the coarse duty cycles represented by $\hat{d}_l$ is given by $$l = 0 \ldots \frac{N_e}{4}. \quad (1.6)$$

Furthermore, the dynamic range, in particular the desired dynamic range, may be related to the maximum number of quantization levels $L_{max}$. Thus, the maximum number of quantization levels $L_{max}$ can be calculated depending on the desired dynamic range. For calculating, a linear relation can be assumed. By way of example, for a desired a dynamic range of 50 dB or approximately 8 bits, the maximum number of quantization levels $L_{max}$ must be 256 representing 256 quantization levels.

From the roughly calculation above one can conclude that straight forward band pass PWM modulation in the digital domain will result into very high sample frequencies $f_S=1/T_S$ especially when the transmitting carrier frequency $f_C$ is high. The present application provides a digital modulator having reduced digital sample frequency $f_C$ without a loss in the resolution of the final PWM signal. Most applications in communications are using band pass signals with a relative slow varying envelope signal or amplitude signal. This means that the PWM modulation of the radio frequency carrier can be assumed as being quasi stationary. The envelope signal can be sampled with a sample frequency $f_P=1/T_P$ which should be sufficient to fulfil the Nyquist criterion for the envelope bandwidth. Furthermore, the sample frequency $f_P$ may be much lower as the carrier frequency $f_C$. The ratio between the envelope or duty cycle sample frequency $f_P$ and the carrier frequency $f_C$ is given by $$T_P = M * T_C \quad (1.7)$$

What is more, a quantized envelope signal $A_n$ fulfilling the requirements for a desired dynamic range can be converted into a quantized duty cycle $d_n$ by following equation $$d[n] = \frac{1}{\pi} \arcsin(A[n]). \quad (1.8)$$

Figure 2:
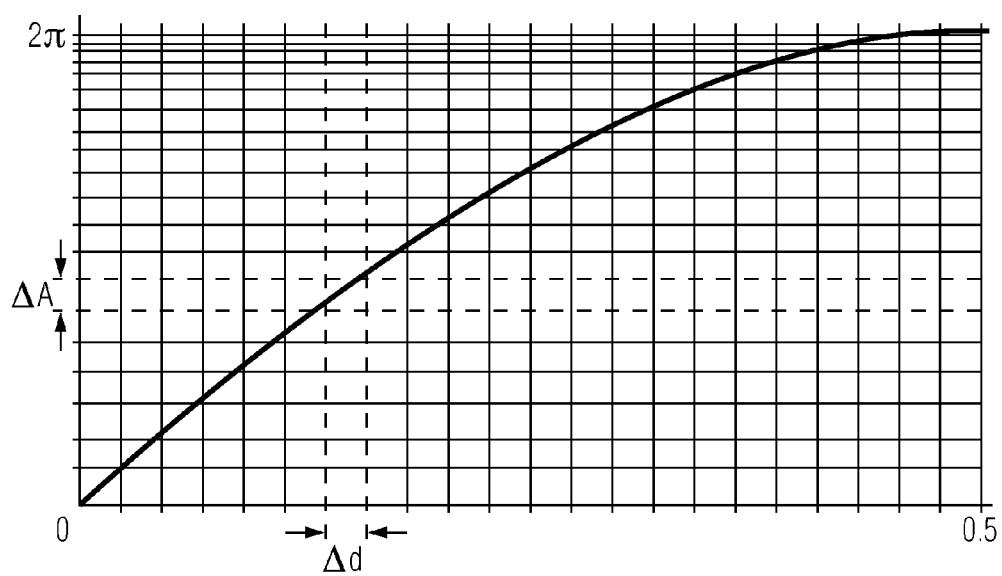
FIG. 2 depicts a further diagram comprising the ratio of an exemplified quantized envelope signal and quantized duty cycle.

This equation is also shown in FIG. 2. FIG. 2 shows a further diagram comprising the ratio of an exemplified quantized envelope signal $A_n$ and quantized duty cycle $d_n$. Thereby, the y-axis runs from A=0 to A=2p and the x-axis runs from d=0 to $d_{max}$=0.5.

Figure 3:
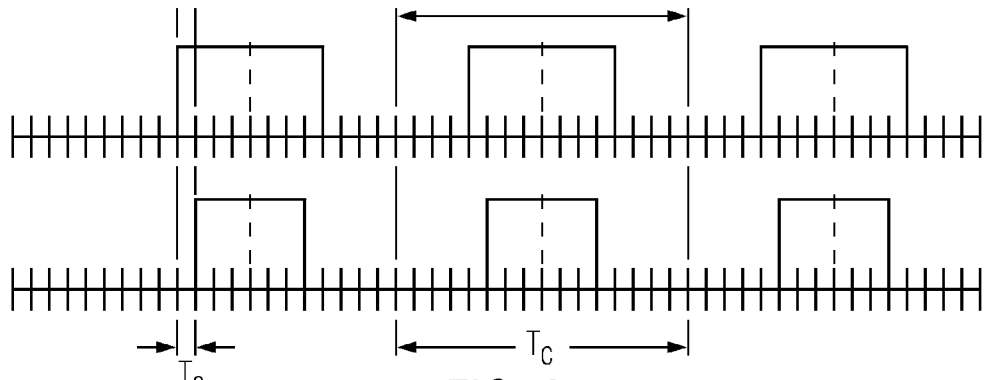
FIG. 3 depicts a further diagram comprising the first symbol pulse width modulated waveform and the second pulse width modulated waveform.

In addition, FIG. 3 shows a further diagram comprising the first symbol pulse width modulated waveform and the second pulse width modulated waveform. Shown are exemplified streams of the first symbol PWM waveform and the second symbol PWM waveform.

Figure 4:
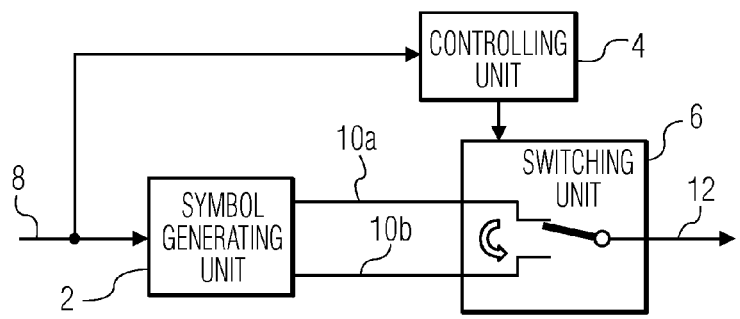
FIG. 4 depicts a first embodiment of the digital modulator according to the present application.

In FIG. 4, a first simplified embodiment of the digital modulator according to the present application is shown. The shown digital modulator comprises an input terminal 8. Via the input terminal 8, the digital modulator may receive a digital signal. For instance, the digital signal can be generated by a suitable signal generator (not shown) depending on the information being transmitted.

The digital signal can be fed to an arranged symbol generating unit 2. The symbol generating unit 2 may be a suitable generator for generating a PWM pulse, PPM pulse or the like. Furthermore, the symbol generating unit 2 comprises a first output terminal 10a and a second output terminal 10b.

The two output terminals 10a and 10b of the symbol generating unit 2 are connected to a switching unit 6. The switching unit 6 may be a suitable switch. As can be seen from FIG. 4, the switching unit can be controlled by a controlling unit 4. Thereby, the controlling unit 4 comprises a communication to the input terminal 8. Moreover, a third output terminal 12 is arranged at the switching unit 6. The third output terminal 12 may be provided for forwarding the desired modulated output signal to further processing units, like power amplifiers or the like (not shown). A detailed elucidation of the functioning of the present digital modulator occurs subsequently.

Figure 5:
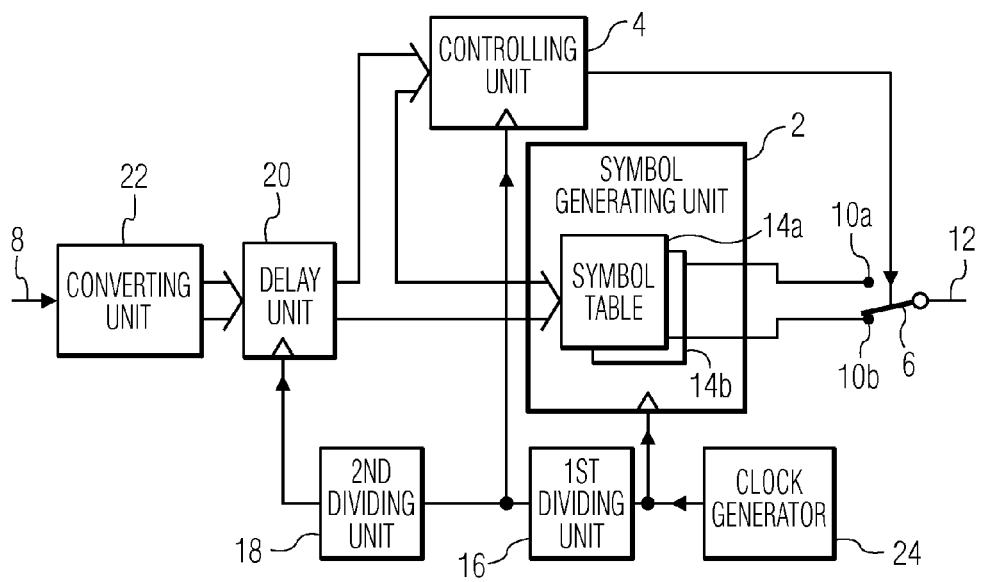
FIG. 5 depicts a second embodiment of the digital modulator according to the present application.

FIG. 5 shows a second simplified embodiment of the digital modulator according to the present application. The shown embodiment comprises more details than the previous embodiment. First, the depicted digital modulator comprises a converting unit 22. The converting unit may be configured to convert a quantized input signal, like a quantized envelope signal $A_{n+1}$, to a suitable quantized signal for further processing, like a quantized duty cycle signal $d_{n+1}$, according to equation 1.8.

In addition, the quantized signal, such as the quantized duty cycle signal $d_{n+1}$, can be forwarded to a delay unit 20. The resulting signal, like the delayed quantized duty cycle signal $d_n$ can be divided into two components, wherein one component may represent the LSB bits of $d_n$ and the other component may represent the MSB bits of $d_n$. Thereby, the MSB bits can be fed to the symbol generating unit 2, while the LSB bits can be forwarded to the controlling unit 4.

Moreover, the symbol generating unit 2 according to the shown embodiment comprises two symbol tables 14a and 14b. In the symbol tables 14a and 14b, the possible symbol waveforms can be recorded, wherein each symbol waveform can be associated to a particular value of the received MSB bits. Furthermore, each of the symbol tables 14a and 14b can be connected to a respective output terminal 10a and 10b indicating that one symbol table 14a is used for generating the first symbol waveform and the other symbol table 14b is used for generating the second symbol waveform. It shall be understood that, according to further variants of the present application, merely one symbol table or a plurality of symbol tables can be arranged as well as the symbol tables may be identical or different to each other.

The LSB bits are forwarded to the controlling unit 4. The controlling unit 4 can be configured to control the switching unit 6 depending on the LSB bits.

Further the shown digital modulator comprises a clock circuit. As can be seen from FIG. 5, the digital modulator comprises a clock generator 24, like any suitable clock generator. The clock generator 24 may generate a first sample frequency $f_S$ being directly used for driving the symbol generating unit 2. Subsequently, a suitable first dividing unit 16 comprising a first dividing factor $N_e$ is arranged. The second clock signal comprising a reduced frequency $f_C$ representing the carrier frequency can be used for driving the controlling unit 4. Additionally, the second clock signal can be divided by a dividing factor M using the arranged second dividing unit 18 for generating a third clock signal comprising a reduced frequency $f_P$. The provided delay unit 20 can be driven by this clock signal. It shall be understood that, according to other variants of the present application, more than one clock generator can be arranged. For instance, for each required clock signal, a respective clock generator can be arranged.

Figure 6:
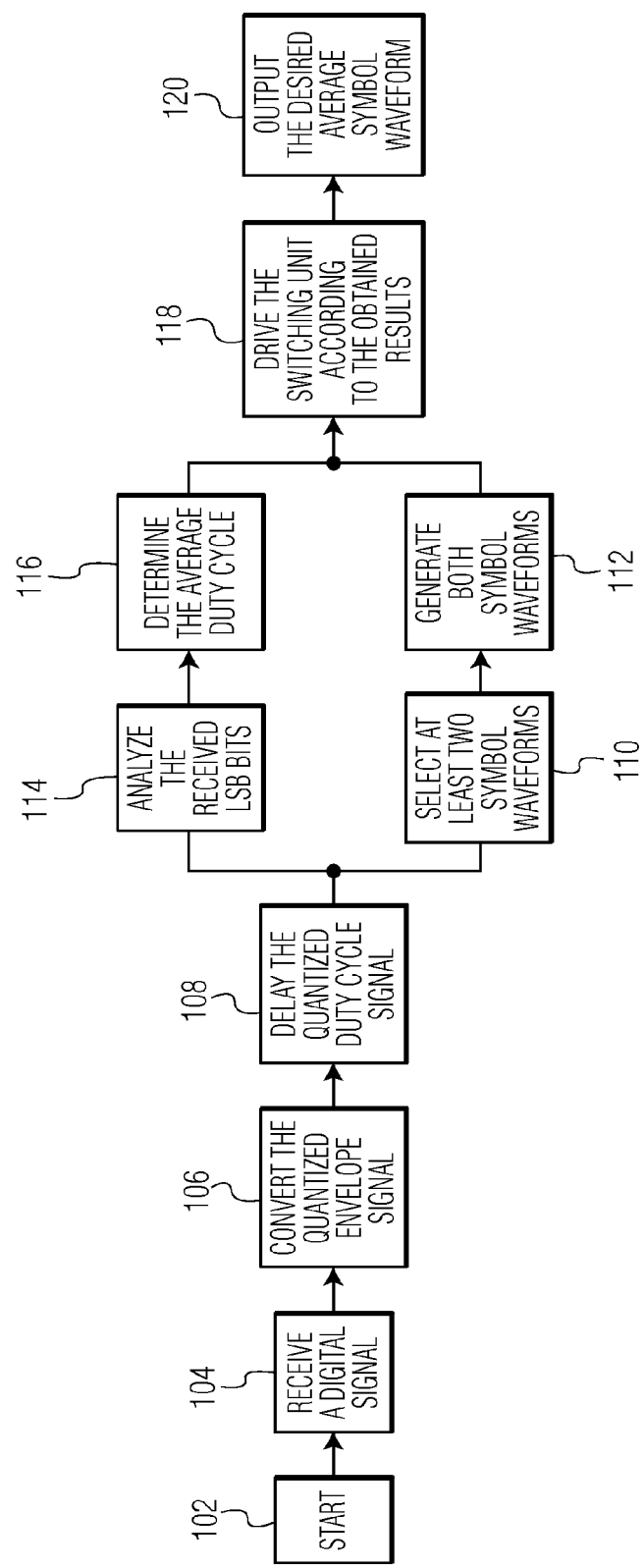
FIG. 6 depicts an exemplified flowchart of the method according to the present application.

The functioning of the digital modulator according to FIGS. 4 and 5 is elucidated in the following with the aid of FIG. 6. FIG. 6 shows an exemplified flowchart of the method according to the present application.

After starting the method in a first step 102, a signal, in particular a digital signal is received by the digital modulator via input terminal 8 in step 104. The digital signal may be generated by a signal generator depending on the information being transmitted and may be a quantized envelope signal or phase signal. For simplicity reasons, the method of the present application is merely elucidated with respect to an envelope signal. However, it shall be understood that similar steps may also apply for a phase signal.

In a next step 106, the quantized envelope signal $A_{n+1}$ can be converted by the converting unit 22 to a quantized duty cycle signal $d_{n+1}$. For instance, a suitable processing device may perform converting using equation 1.8. Furthermore, the quantized duty cycle signal $d_{n+1}$ can be delayed by a suitable delay unit 22 to achieve the quantized duty cycle signal $d_n$ in step 108. This can be performed depending on the third clock signal comprising a less frequency $f_P$ than the sample frequency $f_S$.

The obtained quantized duty cycle signal $d_n$ can be divided into LSB bits and MSB bits. The LSB bits can be forwarded to the controlling unit 4, while the MSB bits can be fed to the symbol generating unit 2. Forwarding the respective bits of the quantized duty cycle signal $d_n$ can be performed parallel.

The symbol generating unit 2 is configured to select at least two symbol waveforms comprising coarse parameter values, in particular coarse duty cycles $\hat{d}_l$ and $\hat{d}_{l+1}$, wherein the symbol waveforms may be PWM symbol waveforms, depending on the received MSB bits of the quantized duty cycle signal $d_n$ in step 110. Thereby, the symbol generating unit 2 may comprise two symbol tables 14a and 14b, wherein each symbol table 14a, 14b includes particular symbol waveforms comprising coarse duty cycles $\hat{d}_l$ each associated to particular values of the received MSB bits. In more detail, the recorded symbol waveforms within the symbol tables 14a and 14b are merely symbol waveforms comprising coarse duty cycles $\hat{d}_l$, which do not comprises the required accuracy for the desired dynamic range. According to the present application, two adjacent coarse symbol waveforms comprising two adjacent duty cycles $\hat{d}_l$ and $\hat{d}_{l+1}$ are determined. More particularly, at a time instance $nT_P$ the sampled envelope or duty cycle value may be forming an address signal $d_n$ from which the MSB bits are used to select two basic adjacent coarse waveforms $\hat{d}_l$ and $\hat{d}_{l+1}$ in the symbol table 14a, 14b.

Figure 7:
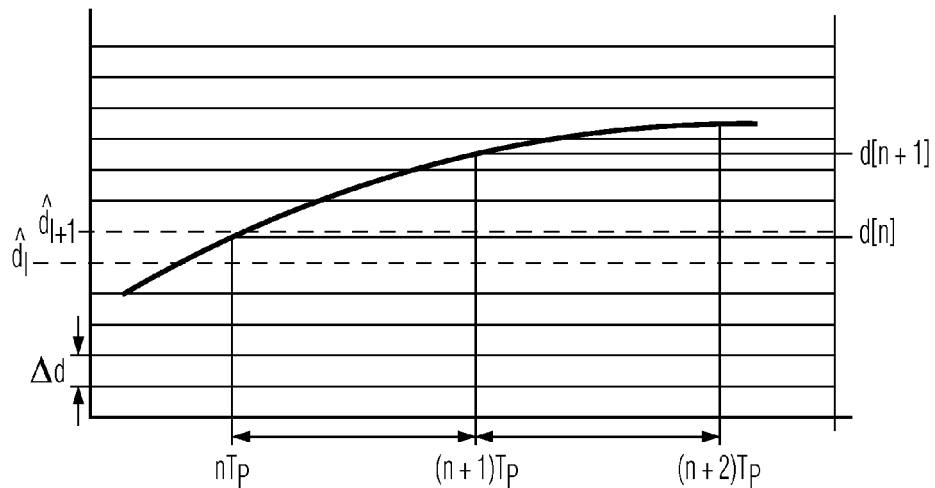
FIG. 7 depicts a further diagram comprising the duty cycles of the first symbol pulse width modulated waveform and the second pulse width modulated waveform.

FIG. 7 shows a further diagram comprising the duty cycles of the first symbol pulse width modulated waveform and the second pulse width modulated waveform. As can be seen from FIG. 7, at time instance $nT_P$ the duty cycle d[n] of the desired output signal is located between two adjacent coarse waveforms $\hat{d}_l$ and $\hat{d}_{l+1}$. After a time period $M \cdot T_P$, wherein $M = f_C/f_P$, at time point $(n+1)T_P$, the next desired duty cycle d[n+1] is reached. From the previous derivations and from FIG. 7, the conditions for the selection of the first and second adjacent coarse waveforms comprising the duty cycles $\hat{d}_l$ and $\hat{d}_{l+1}$ can obtained by the following equations $$\hat{d}_l < d_n$$

$$\hat{d}_{l+1} > d_n \quad (1.9)$$

In a next step 112, both symbol waveforms comprising the duty cycles $\hat{d}_l$ and $\hat{d}_{l+1}$ can be generated depending on the sample frequency $f_S$ and outputted via the first and second output terminal 10a and 10b by the symbol generating unit 2.

What is more, the controlling unit 4 can also analyzed the received LSB bits in step 114. For obtaining the desired modulated output signal comprising the desired duty cycle using the two determined symbol waveforms comprising the coarse duty cycles $\hat{d}_l$ and $\hat{d}_{l+1}$, the average duty cycle $d_{n,av}$ can be determined by means of adapting switching between both symbol waveforms having the duty cycles $\hat{d}_l$ and $\hat{d}_{l+1}$ in step 118. However, the switching time point must be determined depending on the LSB bits by the controlling unit 4. In other words, the time period each switching unit 6 is closed to a particular output terminal 10a, 10b of the symbol generating unit 2 must be determined.

The LSB bits of $d_n$ can be used for determining the time periods. The average symbol waveform can be obtained by closing switching unit 6 for the time $N.T_c$ to the first output terminal 10a, and next closing switching unit 6 for the remaining time period to the second output terminal 10b given by $(M-N)T_c$. Thereby, N can be determined depending on the LSB bits. More particularly, the LSB bits of $d_n$ will select a two-level waveform which may determine the time period the switching unit 6 is closed to a particular output terminal 10a, 10b of the symbol generating unit 2. The average new duty cycle signal $d_{n,av}$ may be than given by $$d_{n,av} = \frac{(M-N)\hat{d}_l + N\hat{d}_{l+1}}{M} = \frac{M\hat{d}_l - N\hat{d}_l + N(\hat{d}_l + \Delta d)}{M} = \hat{d}_l + \frac{N}{M}\Delta d. \quad (1.10)$$

Equation 1.10 can be simplified for a PWM pulse as well as for a PPM pulse. For a PWM pulse the average duty cycle $d_{n,av}$ is given by $$d_{n,av} = \hat{d}_l + \frac{N}{M}\Delta d = \hat{d}_l + \frac{2N}{MN_e} \quad (1.11)$$

and for a PPM pulse the average duty cycle $d_{n,av}$ is given by $$d_{n,av} = \hat{d}_l + \frac{N}{M}\Delta d = \hat{d}_l + \frac{N}{MN_e} \quad (1.12)$$

Then in step 116, the controlling unit 4 may drive the switching unit 6 according to the obtained results. As already mentioned the switching unit 6 may switch respectively and output the desired average symbol waveform or desired modulated output signal in step 120 for further processing.

Figure 8:
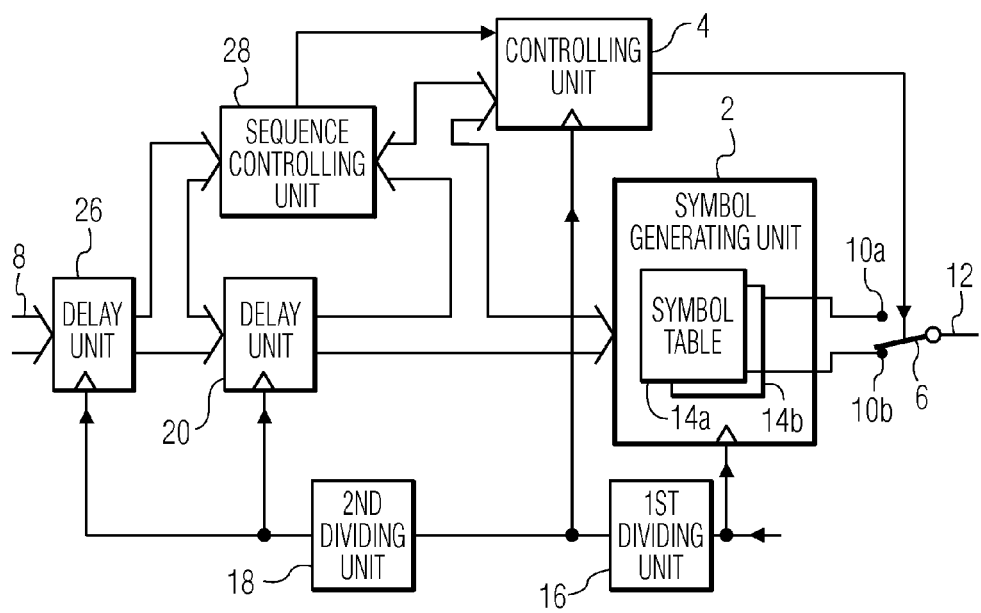
FIG. 8 depicts a third embodiment of the digital modulator according to the present application.

FIG. 8 shows a third embodiment of the digital modulator according to the present application. Compared to the second embodiment (FIG. 5), the third embodiment of the digital modulator comprises additionally a further delay unit 26 and a sequence controlling unit 28. For saving the simplicity of the present embodiment, a clock generator and a converting unit are not depicted.

Since the main function of the present digital modulator is already known, merely the differences caused by the additional units 26 and 28 are pointed out in detail. The input signal $d_{n+2}$ received via input terminal can be delayed by delay unit 26 comprising the same delay factor $T_P$ as delay unit 20. The obtained signal $d_{n+1}$ is fed to the further delay unit 20 as well as to the sequence controlling unit 28.

Furthermore, the delayed signal $d_n$ is divided and forwarded according to the previous embodiment. In addition, the LSB bits of $d_n$ are also fed to the sequence controlling unit 28. The sequence controlling unit 28 may be configured to determine depending on the bits of $d_{n+1}$ and $d_n$, which output terminal 10a, 10b of the symbol generating unit 2 is at first connected to the third output terminal 12. More particularly, in case the ratio between M and N does not change, many ways for obtaining the average duty cycle $d_{n,av}$ are possible. However, it is found, according to the present application that the accuracy of the output signal can be further improved, when the transition is smoothed. In particular, it may be better to generate the average of the current duty cycle $d_n$ by first closing the switching unit 6 with the small coarse duty cycle waveform $\hat{d}_l$ and by next closing the switching unit 6 with the large coarse duty cycle waveform $\hat{d}_{l+1}$. This may results in a smooth transition to the next duty cycle $d_{n+1}$.

Furthermore, in FIG. 9, an exemplified table of a 5 bit quantized input signal is shown. In the first column, the actually received duty cycles $d_n$, $d_{n+1}$, etc. are depicted. In the next column, the possible coarse symbol waveforms and their duty cycle $\hat{d}_1$ respectively are shown, while the following columns represent the five bits of the received signal divided into three MSB bits and two LSB bits. It shall be understood that, according to other variants of the present application, the division of the bits into MSB bits and LSB bits can be performed in other ways as well. The following columns are divided in A and B and represent switch pattern to get the wanted average duty cycle $d_{n,av}$. The last column shows the coarse symbol selection by the MSB bits.

By way of example, the digital signal $d_n$ may comprise the value 01010. The MSB bits 010 can be fed to the symbol generating unit 2 and used to select the coarse symbol waveforms in the table. In the present example, the MSB bits are associated to the duty cycle $\hat{d}_2$. Thus, the first waveform may comprise the duty cycle $\hat{d}_2$. As the second coarse waveform, the waveform comprising the duty cycle $\hat{d}_3$ can be selected. This can be performed by an additional symbol table, by predefined rules or the like. The LSB bits 10 may be fed to the controlling unit 4 for determining the respective switch pattern A=1100 and B=0011. The switch pattern indicates the time period each output terminal 10a, 10b of the symbol generating unit 2 is connected to the third output terminal 12.

Figure 10:
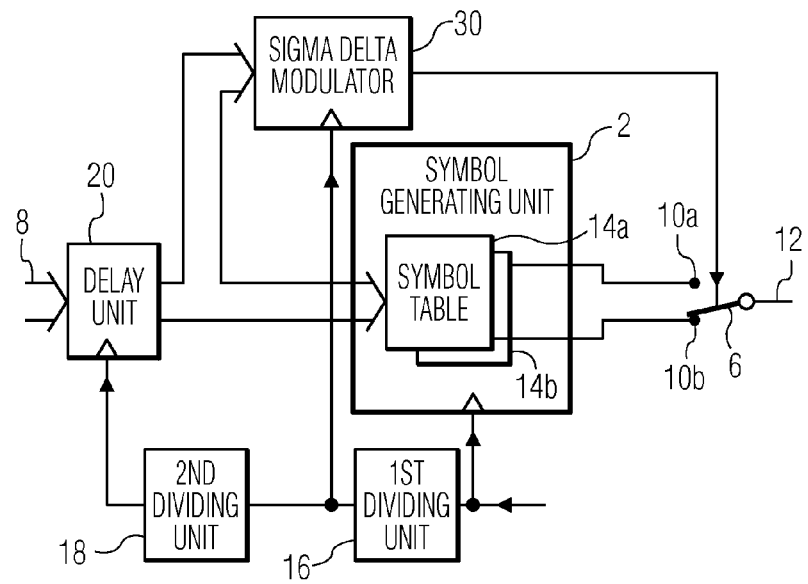
FIG. 10 depicts a fourth embodiment of the digital modulator according to the present application.

FIG. 10 shows a fourth simplified embodiment of the digital modulator according to the present application. The present digital modulator differs from the previous embodiments in that a sigma delta modulator 30 is employed as controlling unit. The output signal pattern of the sigma delta modulator 30 can be next used to control the ratio of the time the switching unit 6 is closed to a particular output terminal 10a, 10b. It shall be understood that a further delay unit and a sequence controlling unit can also be employed within the present embodiment of the digital modulator.

As already mentioned before, the same principle can also be used to create an accurate phase modulated signal. Instead of symbol waveforms with a variable duty cycle d, symbol waveforms comprising a different phase F can be stored in the symbol tables.

Figure 11:
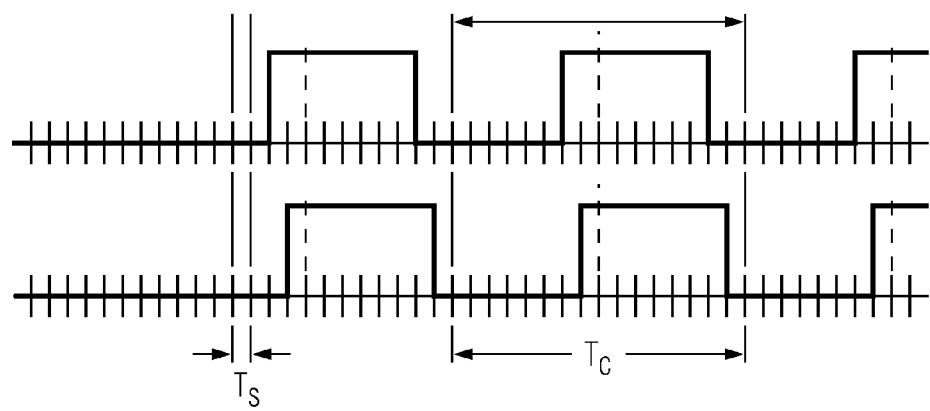
FIG. 11 depicts a further diagram comprising the first symbol pulse position modulated waveform and the second position width modulated waveform.

An exemplified diagram comprising the first symbol pulse position modulated waveform and the second pulse position modulated waveform is shown in FIG. 11. The present examples of two adjacent symbols shown in FIG. 11 may comprise different phase F.

Figure 12:
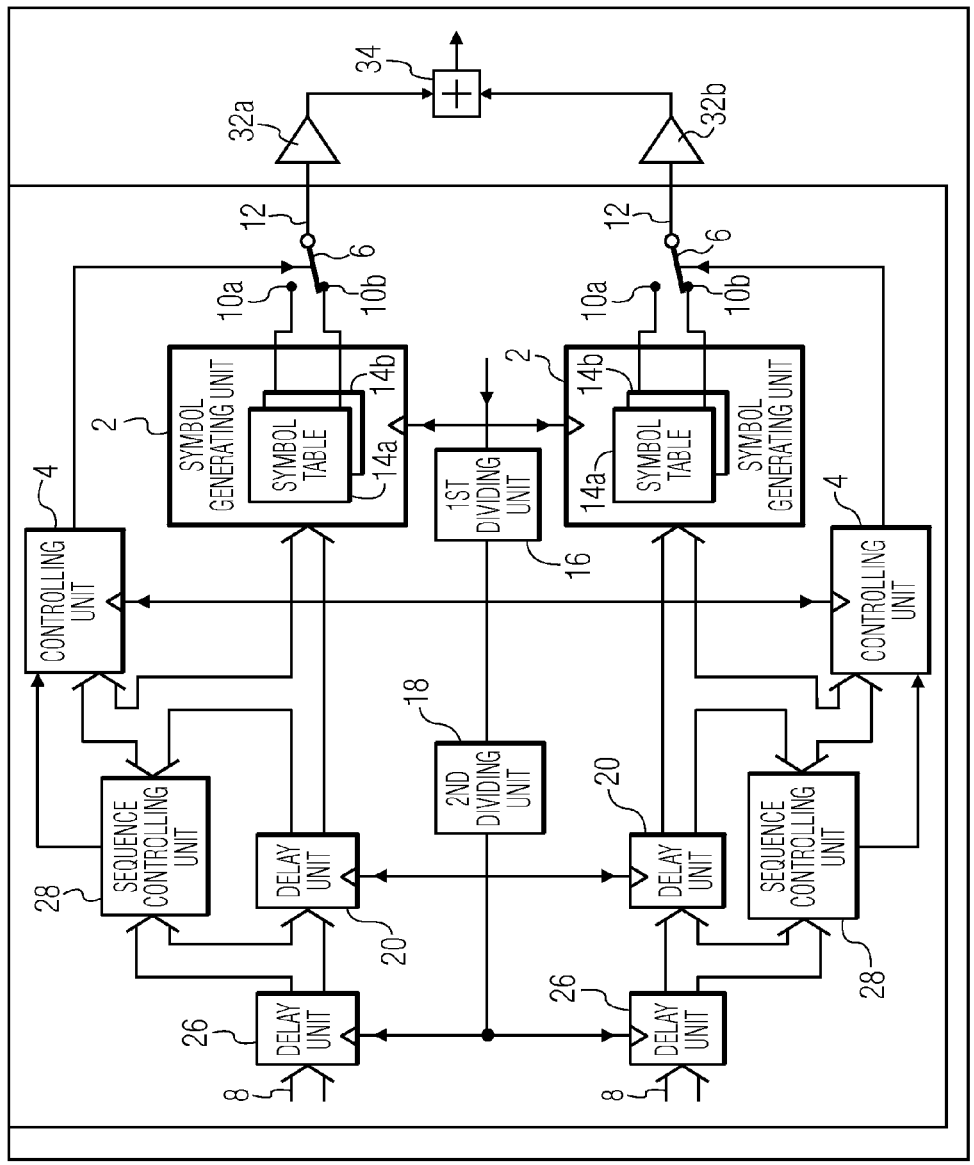
FIG. 12 depicts a first embodiment of the transmitter comprising the digital modulator according to the present application.

FIG. 12 shows a first embodiment of the transmitter comprising the digital modulator according to the present application. The present transmitter is formed as a switched linear amplification with non-linear components (LINC) transmitter. As can be seen from FIG. 12, the transmitter comprises two digital modulators, such as digital phase modulators, configured to generate phase modulated signals for a switched LINC transmitter. Furthermore, two amplifiers 32a and 32b, in particular switching power amplifiers, are arranged for amplifying the output signals of the respective digital modulator to a suitable transmitting power. The two output signals can also be used to generate a PWM-PPM signal by addition of the two output signals using an adding unit 34. Since the present digital modulator can be a digital phase modulator, the input signals applied at input terminals 8 may be of the form $\Phi_P[n]+\Phi_M[n]$ and $\Phi_P[n]-\Phi_M[n]$, wherein index P represents the phase component and index M the magnitude component.

It shall be noted that since the above stated signals are generated with address signals which select a symbol (symbol table) and a signal pattern (controlling unit) pre-distortion can be incorporated in the coarse "symbol table" and "controlling unit" (=pattern generator).

Figure 13:
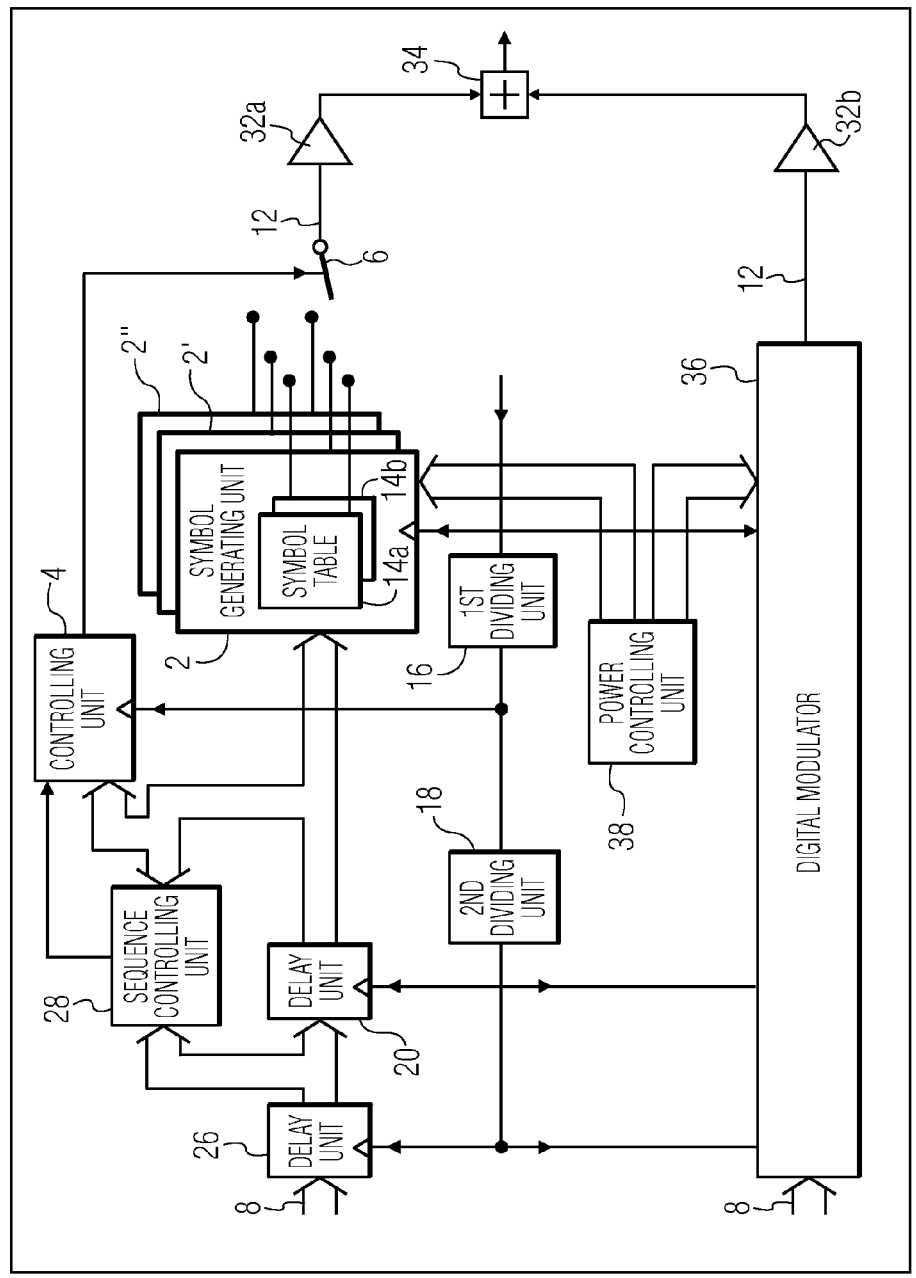
FIG. 13 depicts a second embodiment of the transmitter comprising the digital modulator according to the present application.

Furthermore, it is found that every duty cycle d can be chosen for PPM under the condition that both symbols have the same duty cycle, so by changing the symbol generating units the power of the signal can also be controlled. Extra power control in the switched LINC concept according to the previous embodiment can be obtained by changing the duty cycle of the coarse symbols in the symbol tables 14a, 14b, which means in practice that another symbol generating unit has to be selected. This principle is shown in FIG. 13. FIG. 13 shows a second embodiment of the transmitter comprising the digital modulator according to the present application. For saving the simplicity of the embodiment in FIG. 13, merely one digital modulator is shown in depth, while the further digital modulator is depicted by a rectangle 36. The further digital modulator may correspond to the digital modulator shown in depth.

As can be seen from FIG. 13, a plurality of symbol generating units 2, 2', 2" are arranged indicated by the dotted lines. Furthermore, a power controlling unit 38 is arranged. The power controlling unit 38 may be configured to select the most suitable generating unit 2, 2', 2". The power efficiency can be increased. By way of example, an automatic gain control (AGC) can be implemented as power controlling unit 38.

Figure 14:
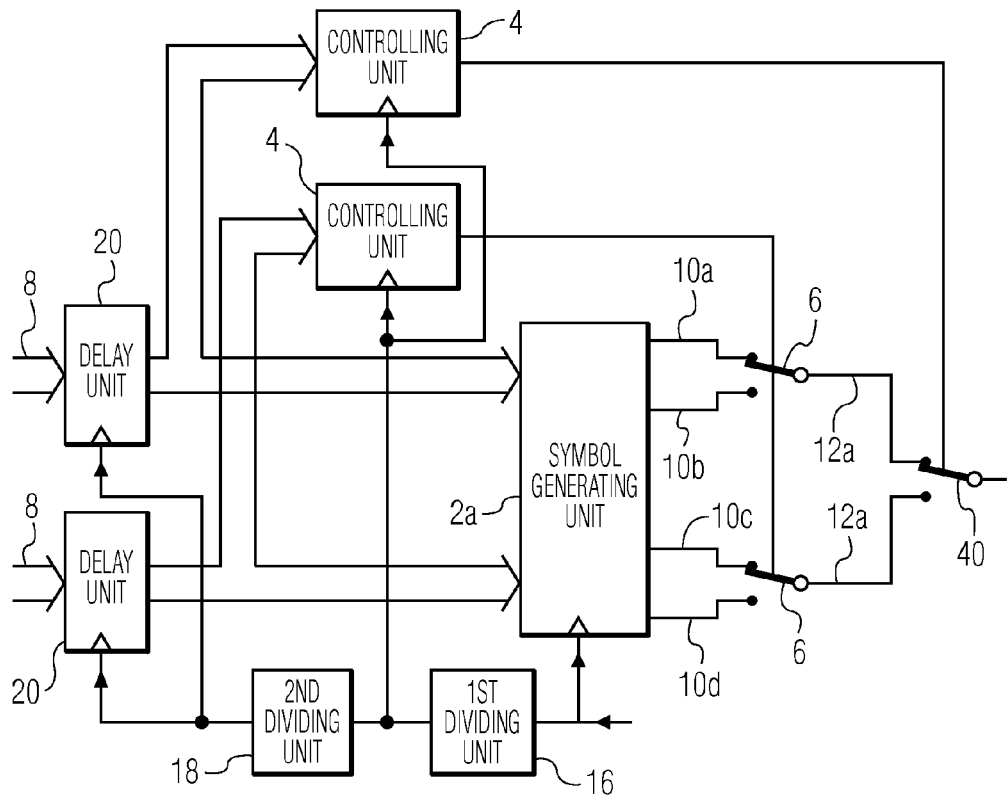
FIG. 14 depicts a third embodiment of the transmitter comprising the digital modulator according to the present application.

It may be also possible to combine the previous mentioned digital envelope modulator and digital phase modulator within a transmitter. In FIG. 14, a third embodiment of the transmitter comprising the digital modulator according to the present application is shown. The shown embodiment uses the principles stated above for generating the wanted PWM-PPM signal The depicted transmitter comprises two input terminals 8 for receiving signals $\Phi_P[n+1]$ and $d_{n+1}$. Subsequent to the respective delay units 20, the MSB bits of the duty cycle d[n] (envelope) and phase $\Phi_P[n]$ can be used to select four symbol waveforms. Therefore, the symbol generating unit 2a may comprise four output terminals 10a to 10d. The chosen symbol waveforms for the duty cycle d and phase $\Phi$ may be the coarse representation of the desired duty cycle d and phase $\Phi$. Furthermore, two switching units 6 are arranged for obtaining two symbol waveforms, like stream A and stream B, wherein these symbol waveforms stream A and stream B are more accurate. At output terminal 12a, stream A may be applied, while at output terminal 12b, stream B may be applied. More particularly, the average duty cycle d of both streams A and B may be equal and accurate, since the arranged switching units 6 are controlled depending on the LSB bits of signal d[n].

However, streams A and B differs in their phase $\Phi$. For obtaining the desired average output signal, i.e. the wanted PWM-PPM signal, a further switching unit 40 is arranged, wherein the switching condition are given by $$N_2 * T_C \text{ and } (M-N_2)*T_C. \tag{1.12}$$

In other words, the switching unit 40 is controlled depending on the LSB bits of signal $\Phi_P[n]$ for obtaining besides the accurate duty cycle d also the accurate phase $\Phi$.

Figure 15:
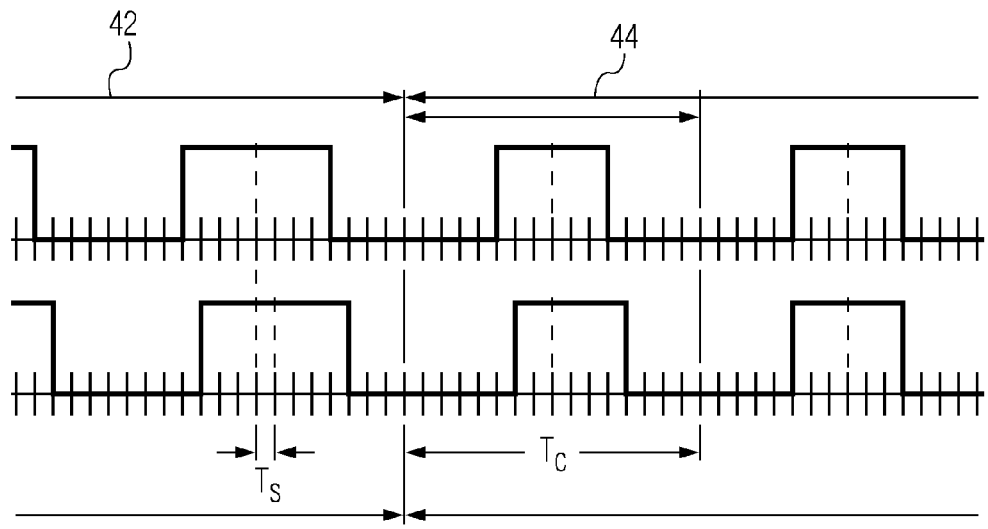
FIG. 15 depicts a further diagram comprising a first symbol stream and a second symbol stream.

In FIG. 15, a further diagram shows the first symbol stream A and the second symbol stream B. Thereby, the upper stream shown in FIG. 15 represents stream A, wherein stream A is the first or second symbol waveform, while the lower stream shown in FIG. 15 represents stream B, wherein stream B is the third or fourth symbol waveform. Furthermore, reference sign 42 indicates $N_1$ times first and third symbol waveforms, while reference sign 44 indicates $(M-N_1)$ times second and fourth symbol waveforms.

The application has been described above by means of exemplary embodiments. It should be noted that there are alternative ways and variations which are obvious to a skilled person in the art and can be implemented without deviating from the scope and spirit of the appended claims.

Furthermore, it is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

The invention claimed is:

1. A digital modulator, comprising:
   at least one input terminal configured to receive at least one signal,
   a symbol generating unit comprising a first output terminal and at least a second output terminal,
   wherein the symbol generating unit is configured to generate a first symbol waveform for the first output terminal depending on the received signal, and
   wherein the symbol generating unit is configured to generate at least a second symbol waveform for the second output terminal depending on the received signal,
   wherein the first symbol waveform comprises at least one different parameter value compared to the second symbol waveform,
   at least one third output terminal connectable to at least one of the first output terminal and the second output terminal via a switching unit,
   a controlling unit configured to control the switching unit depending on the received signal such that a modulated output signal is generated, and
   a sequence controlling unit configured to control the sequence of communication establishing of the switching unit depending on at least one of the current received signal and the next received signal to smooth a transition from one duty cycle or phase to a next duty cycle or phase by first closing the switching unit with a small coarse duty cycle waveform and next closing the switching unit with a large coarse duty cycle.

2. The digital modulator according to claim 1, wherein the received signal is a first quantized signal depending on at least one of:
   an envelope component being transmitted,
   a phase component being transmitted.

3. The digital modulator according to claim 2, further comprising a converting unit configured to convert at least one of the received first quantized envelope component and the phase component into a second quantized signal comprising the parameter value.

4. The digital modulator according to claim 1, wherein the parameter value is at least one of:
   a duty cycle, and
   a phase.

5. The digital modulator according to claim 1, wherein the symbol generating unit is configured to generate
   the first symbol waveform comprising a higher parameter value than the modulated output signal, and
   the second symbol waveform comprising a lower parameter value than the modulated output signal.

6. The digital modulator according to claim 1, wherein the symbol generating unit is configured to generate:
   a pulse width modulated symbol waveform, and
   a pulse position modulated symbol waveform.

7. The digital modulator according to claim 1, further comprising
   a clock generator configured to generate a first clock signal, wherein the first clock signal depends at least on the dynamic range of the digital modulator.

8. The digital modulator according to claim 7, wherein at least the symbol generating unit is configured to be controllable depending on the first clock signal.

9. The digital modulator according to claim 7, further comprising a first dividing unit configured to generate a second clock signal depending on the first clock signal and a first dividing factor.

10. The digital modulator according to claim 9, wherein at least the controlling unit is configured to be controllable depending on the second clock signal.

11. The digital modulator according to claim 9, further comprising a second dividing unit configured to generate a third clock signal depending on the second clock signal and a second dividing factor.

12. The digital modulator according to claim 11, wherein at least one delay unit is configured to be controllable depending on the third clock signal.

13. The digital modulator according to claim 1, wherein the symbol generating unit comprises at least one symbol table provided for determining at least one of the first symbol waveform and the second symbol waveform depending on the received signal.

14. The digital modulator according to claim 13, wherein the at least one symbol table is provided for determining at least one of the first symbol waveform and the second symbol waveform depending on at least one most significant bit of the received signal.

15. The digital modulator according to claim 1, wherein the controlling unit is configured to control the switching unit depending on at least one least significant bit of the received signal.

16. The digital modulator according to claim 1, wherein the controlling unit is formed as a sigma delta modulator.

17. The digital modulator according to claim 1, further comprising
   a power controlling unit,
   wherein the power controlling unit is configured to control the selection of at least two generating units.

18. A transmitter comprising a digital modulator according to claim 1.

19. The transmitter according to claim 18, further comprising at least one amplifying unit.

20. The transmitter according to claim 18, wherein the transmitter is formed as a switched linear amplification with non-linear components transmitter.

21. A method for generating a modulated output signal, comprising:
   receiving at least one signal,
   generating a first symbol waveform depending on the received signal,
   generating at least a second symbol waveform depending on the received signal,
   wherein the first symbol waveform comprises at least one different parameter value compared to the symbol second waveform,
   generating the modulated output signal by switching a third output terminal to at least the first symbol waveform and/or the second symbol waveform,
   wherein switching is controlled depending on the received signal, and
   controlling the sequence of communication establishing of the switching depending on at least one of the current received signal and the next received signal to smooth a transition from one duty cycle or phase to a next duty cycle or phase by first switching with a small coarse duty cycle waveform and next switching with a large coarse duty cycle.

22. A non-transitory computer readable medium having a computer program stored thereon, the computer program comprising:
   instructions operable to cause a processor to perform the method according to claim 21.

* * * * *